US011661077B2

(12) United States Patent
Qi et al.

(10) Patent No.: US 11,661,077 B2
(45) Date of Patent: May 30, 2023

(54) METHOD AND SYSTEM FOR ON-DEMAND ROADSIDE AI SERVICE

(71) Applicant: Toyota Motor Engineering & Manufacturing North America, Inc., Plano, TX (US)

(72) Inventors: Xuewei Qi, Mountain View, CA (US); Kentaro Oguchi, Mountain View, CA (US)

(73) Assignee: TOYOTA MOTOR ENGINEERING & MANUFACTURING NORTH AMERICA. INC., Plano, TX (US)

( * ) Notice: Subject to any disclaimer, the term of this patent is extended or adjusted under 35 U.S.C. 154(b) by 154 days.

(21) Appl. No.: 17/241,352

(22) Filed: Apr. 27, 2021

(65) Prior Publication Data

US 2022/0340162 A1   Oct. 27, 2022

(51) Int. Cl.
*B60W 60/00* (2020.01)
*H04W 4/44* (2018.01)
*G06V 20/56* (2022.01)
*G06F 18/25* (2023.01)

(52) U.S. Cl.
CPC ........... *B60W 60/001* (2020.02); *G06F 18/25* (2023.01); *G06V 20/56* (2022.01); *H04W 4/44* (2018.02); *B60W 2420/403* (2013.01)

(58) Field of Classification Search
CPC .... B60W 60/001; G09F 27/004; G06F 16/29; G06Q 30/0265; G06Q 50/30; G06Q 30/0633; G05D 1/02; G05D 1/0231; H04L 67/12; B60R 11/02; G01S 17/95; G01C 21/26; G01C 21/3691
See application file for complete search history.

(56) References Cited

U.S. PATENT DOCUMENTS

| | | | |
|---|---|---|---|
| 10,692,365 B2 | 6/2020 | Ran et al. | |
| 2013/0144474 A1* | 6/2013 | Ricci | G06Q 30/0265 701/22 |
| 2019/0339709 A1* | 11/2019 | Tay | G06F 16/29 |
| 2020/0193878 A1* | 6/2020 | Shepard | G09F 27/004 |
| 2021/0005085 A1 | 1/2021 | Cheng et al. | |

FOREIGN PATENT DOCUMENTS

| | | | | |
|---|---|---|---|---|
| CN | 107392347 A | * | 11/2017 | ......... G01C 21/3691 |
| CN | 109141422 A | | 1/2019 | |
| CN | 106548646 B | | 3/2019 | |
| CN | 109557916 A | * | 4/2019 | ........... G05D 1/0231 |
| CN | 110301132 A | * | 10/2019 | ............. G01C 21/26 |

(Continued)

OTHER PUBLICATIONS

Mamoudou Sangare et al.; "Predicting Vehicles' Positions Using Roadside Units: A Machine-Learning Approach"; 8 pages; Submitted on Sep. 18, 2018; https://hal.archives-ouvertes.fr/hal-01876180/document.

*Primary Examiner* — Yuri Kan

(74) *Attorney, Agent, or Firm* — Dinsmore & Shohl LLP

(57) ABSTRACT

A method comprises receiving a service request from a vehicle, obtaining environment data with one or more sensors, determining a vehicle type of the vehicle based on the service request, determining service data responsive to the service request based on the vehicle type of the vehicle and the environment data, and transmitting a service message comprising the service data to the vehicle.

15 Claims, 5 Drawing Sheets

(56) References Cited

FOREIGN PATENT DOCUMENTS

| | | | | | |
|---|---|---|---|---|---|
| CN | 110751586 | A | * | 2/2020 | ......... G06Q 30/0633 |
| CN | 111121849 | A | | 5/2020 | |
| CN | 111354214 | A | | 6/2020 | |
| CN | 111383456 | A | | 7/2020 | |
| CN | 111383456 | A | * | 7/2020 | ............... G05D 1/02 |
| CN | 109272745 | B | | 10/2020 | |
| CN | 111754581 | A | | 10/2020 | |
| CN | 112486878 | A | * | 3/2021 | ............. G06Q 50/30 |
| DE | 102018008442 | A1 | * | 3/2019 | ............. G01S 17/95 |
| EP | 3618026 | A1 | | 3/2020 | |
| JP | 2005047365 | A | * | 2/2005 | ............. B60R 11/02 |
| KR | 100745719 | B1 | * | 8/2007 | ............. H04L 67/12 |
| WO | 2020/205597 | A1 | | 10/2020 | |

* cited by examiner

METHOD AND SYSTEM FOR ON-DEMAND ROADSIDE AI SERVICE

TECHNICAL FIELD

The present specification relates to a traffic management system and more particularly to a method and system for on-demand roadside AI service.

BACKGROUND

Advancements in artificial intelligence (AI) and deep learning technology are leading to more autonomous vehicles and advanced driving assistance systems (ADAS). Autonomous vehicles and ADAS systems may utilize on-board vehicle sensors and on-board computing resources to identify vehicles and other road agents in their environment and to make driving decisions. However, vehicles have a limited amount of on-board computing power, a limited number of on-board sensors, and a limited field of view while driving. As such, the capabilities of an autonomous vehicle or an ADAS system may be limited by these and other factors. Therefore, a need exists for a method and system for on-demand roadside AI service.

SUMMARY

In an embodiment, a method may include receiving a service request from a vehicle, obtaining environment data with one or more sensors, determining a vehicle type of the vehicle based on the service request, determining service data responsive to the service request based on the vehicle type of the vehicle and the environment data, and transmitting a service message to the vehicle including the determined service data.

In another embodiment, a method may include collecting environment data with one or more vehicle sensors, transmitting a service request from the vehicle to a roadside server, receiving, from the roadside server, a service message comprising service data responsive to the service request, fusing the service data with the environment data to obtain fused data, and determining one or more driving instructions based on the fused data.

In another embodiment, a roadside server may comprise a controller configured to receive a service request from a vehicle, obtain environment data with one or more sensors, determine a vehicle type of the vehicle based on the service request, determine service data responsive to the service request based on the vehicle type of the vehicle and the environment data, and transmit a service message to the vehicle including the determined service data.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
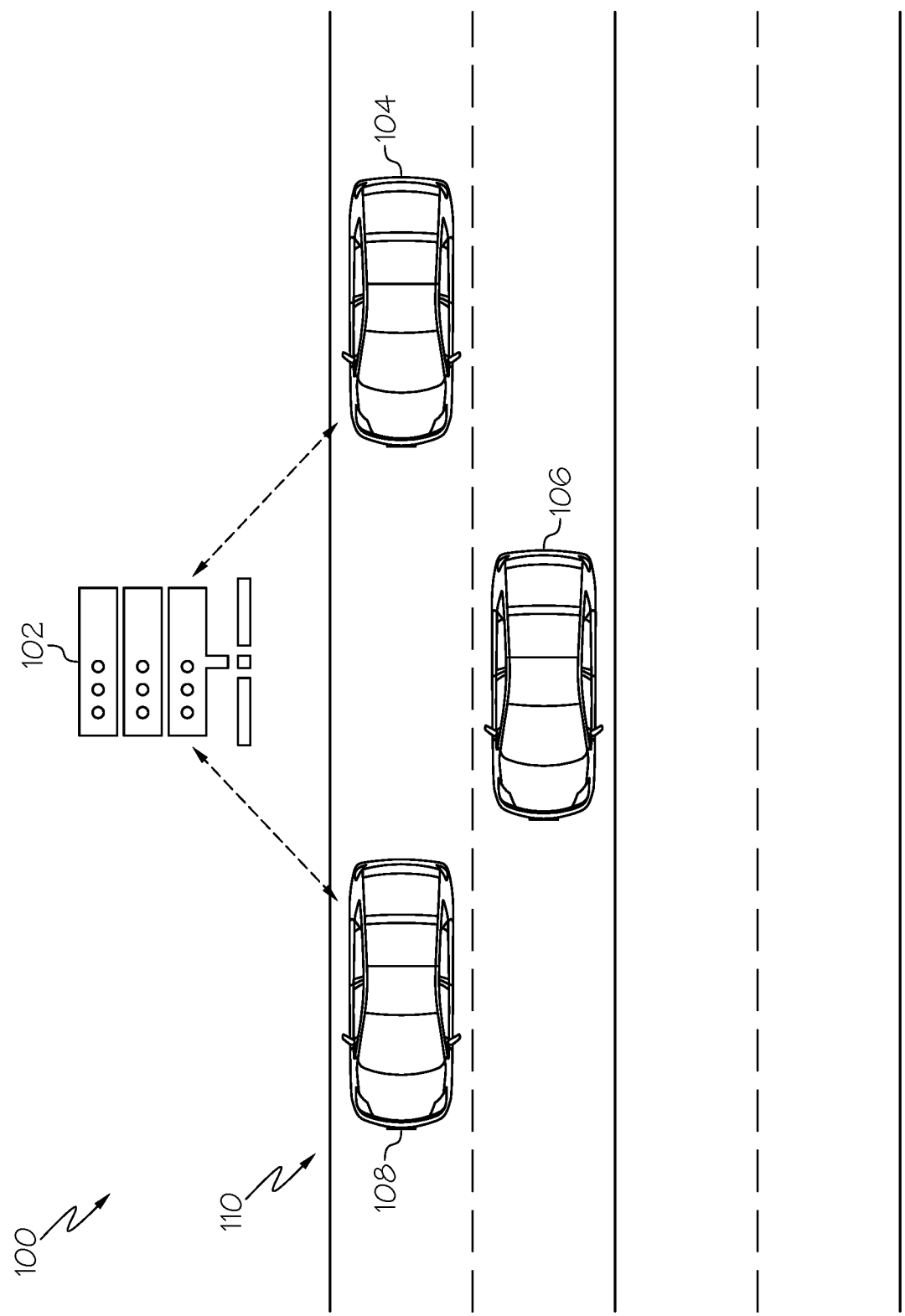
FIG. 1 schematically depicts a system comprising a roadside server, according to one or more embodiments shown and described herein.

The embodiments disclosed herein include systems and methods for on-demand roadside AI service. Many vehicles in use today are either fully or partly autonomous. Autonomous vehicles may perform certain driving functions without the need for actions of a driver. An autonomous vehicle may utilize one or more on-board sensors to gather data about the driving environment of the vehicle. The autonomous vehicle may then use on-board computing resources to determine the location of the vehicle, identify other road objects, and make driving decisions accordingly.

However, using only on-board resources has certain limitations. One potential limitation is the limited sensing ability of on-board sensors. Most sensors are line-of-sight based. Accordingly, vehicle sensors may be limited by obstructions to line-of-sight. In addition, vehicle sensors may only be able to collect data within a certain range. Furthermore, older legacy vehicles may not have any on-board sensors at all.

Another potential limitation is limited positioning information. Autonomous vehicles often rely on GPS data for positioning and localization. However, there may be locations where GPS signals are unreliable or unavailable. In addition, legacy vehicles may have limited or no GPS capabilities.

Another potential limitation is limited computing power. Processing sensor data and performing complex decision making tasks may require significant computing power, which may not be available on-board vehicles. As such, the computing resources available to an autonomous vehicle may limit the performance of the vehicle. Furthermore, legacy vehicles may have even more limited on-board computing resources or no available on-board computing resources at all.

The above limitations as well as other limitations may limit the performance of autonomous or non-autonomous, legacy vehicles. Accordingly, embodiments herein describe an on-demand roadside AI service that may improve vehicle performance. A roadside AI service may comprise a roadside server or roadside computing device that receives customized service requests from vehicles. The service requests may be for perception service, localization service, or decision service. The roadside computing device may have its own sensors to capture environment data and may have computing resources to process data captured by the roadside sensors or data received from requesting vehicles. The roadside computing device may then transmit computed results to a requesting vehicle responsive to a service request.

By utilizing a roadside AI service, vehicles may increase their sensing capabilities since a roadside server may have a field of view that allows it to capture data that cannot be captured by on-board vehicle sensors. In addition, utilizing computing resources of a roadside device may increase the computing capabilities of vehicles without the need to increase on-board computing resources. Furthermore, a roadside server may receive customized requests from vehicles and may transmit different types of data to different types of vehicles. For example, the roadside device may transmit certain data to a fully autonomous vehicle while transmitting other data to a legacy vehicle.

Turning now to the figures, FIG. 1 schematically depicts a system for on-demand roadside AI service. A system 100 includes a roadside server 102. The roadside server 102 may receive requests for roadside AI service from one or more vehicles, as disclosed herein. In the example of FIG. 1, vehicles 104, 106, and 108 drive along a road 110. In the example of FIG. 1, each of the vehicles 104, 106, 108 may be a fully autonomous vehicle, a semi-autonomous vehicle, or a legacy vehicle. As used herein, a legacy vehicle is a vehicle that does not have any autonomous driving features, e.g., a level 0 vehicle. A legacy vehicle may also have limited or no on-board sensors and/or computing resources. While the example of FIG. 1 shows three vehicles, it should be understood that, in other examples, the system 100 may operate with any number of vehicles. Each of the vehicles 104, 106, 108 may be an automobile or any other passenger or non-passenger vehicle such as, for example, a terrestrial, aquatic, and/or airborne vehicle including, but not limited to, a bus, a scooter, a drone, or a bicycle.

The roadside server 102 may be communicatively coupled to one or more of the vehicles 104, 106, 108. In some examples, the roadside server 102 may be a road-side unit (RSU) positioned near the road 110. In these examples, the system 100 may include any number of RSUs spaced along the road 110 such that each RSU covers a different service area. That is, as the vehicles 104, 106, 108 drive along the road 110, the vehicles may be in range of different RSUs at different times such that different RSUs provide coverage at different locations. Thus, as the vehicles 104, 106, 108 drive along the road 110, the vehicles may move between coverage areas of different RSUs.

In other examples, the roadside server 102 may be another type of server or computing device and may be positioned remotely from the road 110. In some examples, the roadside server 102 may be an edge server. In some examples, the roadside server 102 may be a moving edge server, such as another vehicle. In some examples, the roadside server 102 may be a cloud-based server.

As the vehicles 104, 106, 108, drive along the road 110, one or more of the vehicles may transmit a custom roadside AI service request to the roadside server 102. A roadside AI service request may comprise a request for perception service, a request for localization service, or a request for decision service, as disclosed herein. Depending on the type of request and the type of vehicle making the request, a roadside AI service request may include data captured by the vehicle, and may include the type of vehicle making the request. The roadside server 102 may provide different types of service in response to a service request based on the custom request and may transmit different types of data in response to the request based on the type of vehicle making the request, as disclosed herein.

After the roadside server 102 receives an AI service request from a requesting vehicle, the roadside server 102 may process the request, determine the requested data based on the request, and transmit the requested data back to the requesting vehicle in the form of a service message. The requesting vehicle may receive the service message and may utilize the data contained in the service message to update the driving behavior of the vehicle and/or display information to a driver of the vehicle. For connected vehicles (e.g., vehicles having on-board hardware that is able to communicate with external devices), the vehicle hardware may communicate directly with the roadside server 102. For non-connected vehicles, a driver may utilize a smartphone or other hardware device to communicate with the roadside server 102.

Figure 2:
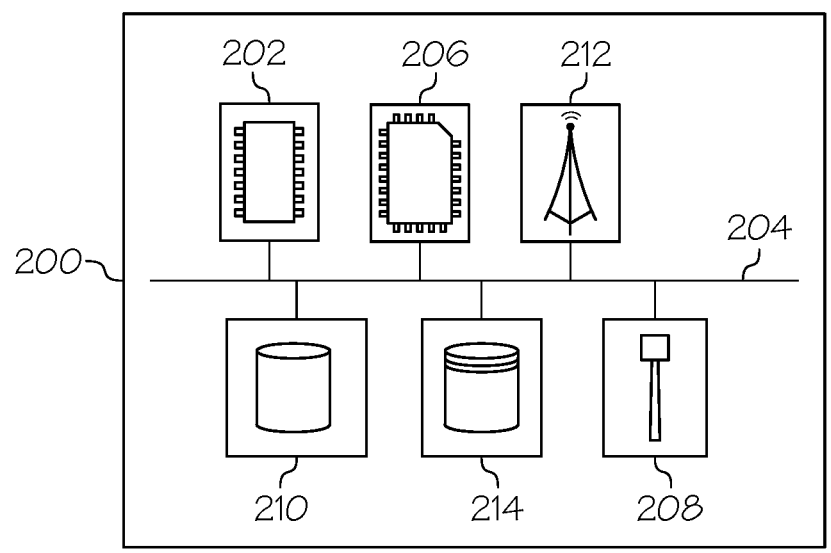
FIG. 2 depicts a schematic diagram of a vehicle system, according to one or more embodiments shown and described herein.

FIG. 2 depicts a vehicle system 200 that may be included in the vehicles 104, 106 and/or 108 of FIG. 1. The vehicle system 200 may represent a vehicle system included in an autonomous vehicle, a semi-autonomous vehicle, or a legacy vehicle. However, certain components of the vehicle system 200 of FIG. 2 may not be included in certain vehicle types in some examples, as disclosed herein.

In the example of FIG. 2, the vehicle system 200 includes one or more processors 202, a communication path 204, one or more memory modules 206, a satellite antenna 208, one or more vehicle sensors 210, a network interface hardware 212, and a data storage component 214, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more sensors 210 may include, but are not limited to, LiDAR sensors, RADAR sensors, optical sensors (e.g., cameras, laser sensors), proximity sensors, location sensors (e.g., GPS modules), and the like. In embodiments, the sensors 210 may monitor the surroundings of the vehicle and may detect other vehicles or road agents on the road. The data captured by the sensors 210 may be processed by the processors 202 to identify and determine the locations of road agents. In embodiments, a fully autonomous vehicle, a semi-autonomous vehicle, and a legacy vehicle may include different sets of sensors. For example, a fully autonomous vehicle may include the advanced sensors such as LiDAR sensors, RADAR sensor for autonomous driving, and a semi-autonomous vehicle may not include some sensors that are included in the fully autonomous vehicle. A legacy vehicle may include the least or none of the sensors.

For autonomous vehicles, the vehicle system 200 may include an autonomous driving module and the data gathered by the sensors 210 may be used by the autonomous driving module to autonomously navigate the vehicle.

Still referring to FIG. 2, the vehicle system 200 comprises network interface hardware 212 for communicatively coupling the vehicle system 200 to the roadside server 102. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the vehicle system 200 may transmit requests for roadside AI service to the roadside server 102 along with sensor data gathered by the sensors 210 or other data associated with such requests.

The network interface hardware 212 may transmit service requests to the roadside server 102, as disclosed herein. The network interface hardware 212 may also receive service messages from the roadside server 102 in response to service requests, as disclosed herein.

Still referring to FIG. 2, the vehicle system 200 comprises a data storage component 214. The data storage component 214 may store data used by various components of the vehicle system 200. In addition, the data storage component 214 may store data gathered by the sensors 210 or data received from the roadside server 102.

The vehicle system 200 may also include an interface. The interface may allow for data to be presented to a human driver and for data to be received from the driver. For example, the interface may include a screen to display information to a driver, speakers to present audio information to the driver, and a touch screen that may be used by the driver to input information. In other examples, the vehicle system 200 may include other types of interfaces.

In some embodiments, the vehicle system 200 may be communicatively coupled to the roadside server 102 by a network. In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
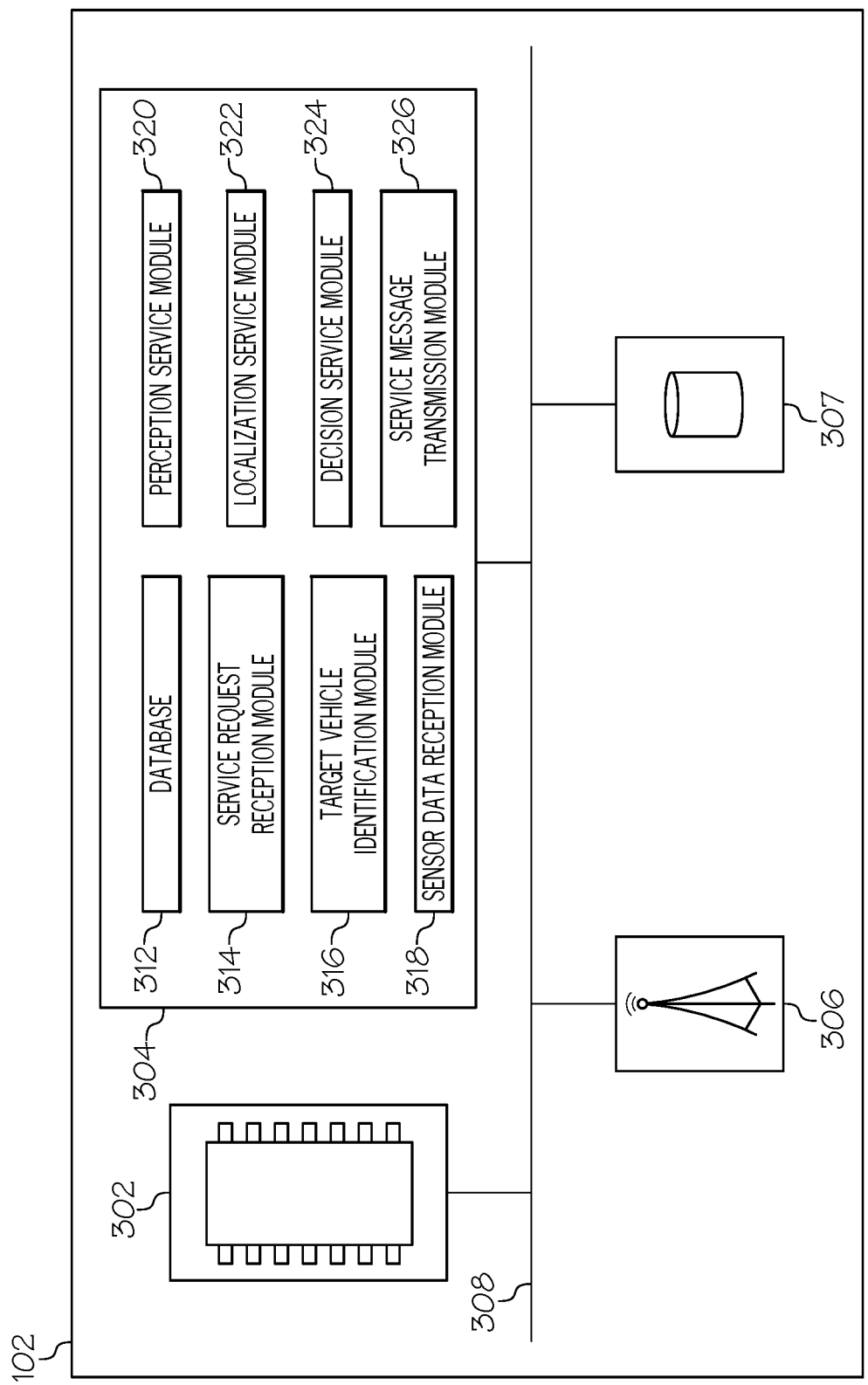
FIG. 3 depicts a schematic diagram of the roadside server of FIG. 1, according to one or more embodiments shown and described herein.

Now referring to FIG. 3, the roadside server 102 comprises one or more processors 302, one or more memory modules 304, network interface hardware 306, one or more sensors 307, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. In some examples, the network interface hardware 306 may include two different channels including a Dedicated Short-Range Communication (DSRC) channel and a millimeter wave radio channel, as discussed in further detail below. The network interface hardware 306 of the roadside server 102 may transmit and receive data to and from vehicles (e.g., vehicles 104, 106, 108 of FIG. 1) and/or smartphones or other devices of vehicle drivers.

The one or more sensors 307 may capture environment data or road data and may include, but are not limited to, LiDAR sensors, RADAR sensors, optical sensors (e.g., cameras, laser sensors), proximity sensors, location sensors (e.g., GPS modules), and the like. The sensors 307 may be capable of capturing road data in a variety of weather conditions (e.g., rain, fog, snow). The sensors 307 may be able to capture road data that vehicle sensors on-board a vehicle are not able to capture. For example, the sensors 307 of the roadside server 102 may have a different perspective view or line of sight than on-board sensors of a vehicle.

The one or more memory modules 304 include a database 312, a service request reception module 314, a target vehicle identification module 316, a sensor data reception module 318, a perception service module 320, a localization service module 322, a decision service module 324, and a service message transmission module 326. Each of the database 312, the service request reception module 314, the target vehicle identification module 316, the sensor data reception module 318, the perception service module 320, the localization service module 322, the decision service module 324, and the service message transmission module 326 may be a program module in the form of operating systems, application program modules, and other program modules stored in one or more memory modules 304. In some embodiments, the program module may be stored in a remote storage device that may communicate with the roadside server 102. In some embodiments, one or more of the database 312, the service request reception module 314, the target vehicle identification module 316, the sensor data reception module 318, the perception service module 320, the localization service module 322, the decision service module 324, and the service message transmission module 326 may be stored in the one or more memory modules 206 of the vehicle system 200 of a vehicle. Such a program module may include, but is not limited to, routines, subroutines, programs, objects, components, data structures and the like for performing specific tasks or executing specific data types as will be described below.

The database 312 may temporarily store AI service requests and sensor data received from vehicles. The database 312 may also store data captured by the sensors 307 of the roadside server 102. The database 312 may also store other data that may be used by the memory modules 304 and/or other components of the roadside server 102.

The service request reception module 314 may receive service requests from vehicles for customized AI service. A service request received by the service request reception module 314 may specify a customized request for AI service. For example, a service request may be a request for perception service, localization service, or decision service.

A request may further specify additional details of the request, as discussed in further detail below. In some examples, a service request may specify the type of a vehicle making the request (e.g., a fully autonomous vehicle, a semi-autonomous vehicle, or a legacy vehicle). In some examples, the type of service performed may depend on the type of the vehicle making the request, as disclosed herein.

In some examples, a service request may be transmitted by the network interface hardware 212 of the vehicle system 200 associated with a vehicle. However, in some examples involving legacy vehicles, a vehicle may not have all of the components of the vehicle system 200 described with respect to FIG. 2. In these examples a driver of a legacy vehicle may utilize a smartphone or other hardware device running an application to generate service requests. In these examples, a service request may be transmitted from a driver's smartphone and may be received by the service request reception module 314.

In embodiments, a service request may be a request for perception service, a request for localization service, or a request for decision service. A request for perception service may comprise a request for the roadside server 102 to detect one or more road objects along a road. The roadside server 102 may respond to a request for perception service by transmitting an object-level perception message, a feature-level perception message, or a raw-data perception message, depending on the specific service request and the type of vehicle making the service request. These perception messages are discussed in further detail below.

A request for localization service may comprise a request for the roadside server 102 to localize, or determine a location of the requesting vehicle. The roadside server 102 may respond to a request for localization service by transmitting a road-level localization message, a lane-level localization message, or a global map localization message, depending on the specific service request and the type of vehicle making the service request. These localization messages are discussed in further detail below.

A request for decision service may comprise a request for the roadside server 102 to determine one or more driving decisions for the requesting vehicle. For example, a decision service may comprise a request for route determination based on certain parameters or a request for specific driving decisions based on perception data. The roadside server 102 may respond to a request for decision service by transmitting a safety related decision and guidance message, an energy efficiency related decision and guidance message, of a travel time related decision and guidance message, depending on the specific service request. These decision messages are discussed in further detail below.

The target vehicle identification module 316 may identify a type of vehicle transmitting a service request received by the service request reception module 314. For example, the target vehicle identification module 316 may determine whether a service request is being made by a fully autonomous vehicle, a semi-autonomous vehicle, or a legacy vehicle. In some examples, the target vehicle identification module 316 may determine a level of automation of a vehicle making a service request (e.g., from L0-L5). In some examples, a service request may specify the type of vehicle making the service request. As such, the target vehicle identification module 316 may identify the type of vehicle making the request based on this information specified in a service request. In other examples, the target vehicle identification module 316 may determine the type of vehicle or level of automation associated with a requesting vehicle based on the type of data included with a service request (e.g., whether sensor data is included with a service request). The type of vehicle and/or the level of automation of a vehicle making a service request may inform the type of data or service message transmitted in response to a service request, as disclosed in further detail below.

The sensor data reception module 318 may receive sensor data captured by the sensors 307 of the roadside server 102. As discussed above, the roadside server 102 may have one or more sensors 307 that may capture road data. This captured data may be received by the sensor data reception module 318. For certain types of service requests (e.g., perception service), the roadside server 102 may utilize data captured by the sensors 307 of the roadside server, as disclosed herein. For other types of service requests, the roadside server 102 may not utilize data captured by the sensors 307.

Because the roadside server 102 may be positioned along a side of a road, the sensors 307 of the roadside server 102 may have a larger field of view than on-board sensors of any individual vehicle. Accordingly, the sensors 307 may be able to capture more and better data than any individual vehicle, and thus, the roadside server 102 may be able to perform better perception service than an autonomous vehicle relying solely on on-board sensors. Accordingly, data captured by the sensors 307 may be received by the sensor data reception module 318 and the received data may be used to perform perception service, as disclosed in further detail below.

The perception service module 320 may perform perception service after receiving a perception service request from a requesting vehicle. As discussed above, the perception service module 320 may perform object-level perception, feature-level perception, or raw-data perception. Object-level perception may comprise the perception service module 320 processing sensor data captured by the sensors 307 to detect one or more objects on a road (e.g., determine bounding boxes for objects), based on the sensor data. An object-level perception message may then be transmitted to the requesting vehicle comprising the locations and shapes of the bounding boxes for the one or more detected objects.

Feature-level perception may comprise the perception service module 320 extracting features from sensor data captured by the sensors 307. A feature-level perception message may then be transmitted to the requesting vehicle comprising the extracted features. After receiving the extracted features, the requesting vehicle may further process the features to detect and/or identify objects.

Raw-data perception may comprise the perception service module 320 simply relaying sensor data captured by the sensors 307 to the requesting vehicle. That is, a raw-data perception message may be transmitted to the requesting vehicle comprises raw data captured by the sensors 307. After receiving the raw sensor data, the requesting vehicle may further process the raw data to detect and/or identify objects.

In some examples, a service request may specify the type of perception service desired by the requesting vehicle (e.g., object-level data, feature-level data, or raw data). In other examples, the perception service module 320 may determine the type of perception service to perform based on the type of vehicle identified by the target vehicle identification module 316. For example, legacy vehicles may not have any on-board computing resources to further process raw data or feature-level data. As such, legacy vehicles may only receive object-level data. Semi-autonomous vehicles may have enough computing resources to process feature-level data but not enough computing resources to process raw data. As such, semi-autonomous vehicles may be able to receive object-level data or feature-level data. Fully autonomous vehicles may have sufficient computing resources to process raw data. Accordingly, fully autonomous vehicles may be able to receive object-level data, feature-level data, or raw data. Accordingly, in some examples, the perception service module 320 may perform object-level perception service when a perception service request is received from a legacy vehicle, the perception service module 320 may perform feature-level perception service when a perception service request is received from a semi-autonomous vehicle, and the perception service module 320 may perform raw data level perception service when a perception service request is received from a fully autonomous vehicle.

The localization service module 322 may perform localization service after receiving a localization service request from a requesting vehicle. As discussed above, the localization service module 322 may perform road-level localization, lane-level localization, or global map localization. The type of localization service to be performed may be specified in a service request.

Road-level localization may comprise an identification of what road segment a requesting vehicle is driving along. However, road-level localization is less precise than lane-level localization. For example, road-level localization may have a resolution of around 10 meters. Road-level localization may be useful for any type of vehicle including autonomous vehicles, semi-autonomous vehicles, or legacy vehicles.

Lane-level localization may comprise an identification of which lane a requesting vehicle is located in or where a requesting vehicle is positioned within a lane. Lane-level localization is more precise than road-level localization. For example, lane-level localization may have a resolution of around 1 meter. Lane-level localization may only be useful to autonomous vehicles and semi-autonomous vehicles, and may not be particularly useful to legacy vehicles. For legacy vehicles with a human driver, the human driver is generally able to assess their position within a lane using their own senses. As such, receiving a lane-level localization message telling a human driver what lane they are in will typically not help the driver. However, for an autonomous vehicle, receiving a lane-level localization message may be used to supplement or replace on-board sensor data to perform appropriate driving maneuvers.

Global map localization may comprise an identification of global coordinates of a requesting vehicle on a map. This may be useful to either autonomous or legacy vehicles to localize their position on a map. Autonomous vehicles may use this information as part of a route guidance. Legacy vehicles may display this information to a human driver to assist the driver.

In embodiments, the localization service module 322 may perform road-level localization, lane-level localization, or global map localization based on sensor data captured by the sensors 307 of the roadside server 102. In some examples, the localization service module 322 may perform localization based on sensor data received from a requesting vehicle as part of a localization service request. That is, a vehicle may gather sensor data using on-board sensors and may utilize the computing resources of the roadside server 102 to perform localization rather than the computing resources of the vehicle itself. In some examples, the localization service module 322 may perform localization based on a combination of sensor data received from a requesting vehicle and sensor data captured by the sensors 307 of the roadside server 102.

The decision service module 324 may perform decision service after receiving a decision service request from a requesting vehicle. As discussed above, the decision service module 324 may perform safety related decision service, energy efficiency related decision service, and travel time related decision service. The decision service module 324 may determine one or more driving decisions for a requesting vehicle based on the service request received from a requesting vehicle. A service request for decision service may include data gathered by on-board vehicle sensors and may specify whether safety related decision service, energy efficiency related decision service, or travel time related decision service is desired. Any type of vehicle may receive any type of decision service.

The decision service module 324 may determine one or more driving decisions for a requesting vehicle. The driving decisions may comprise lane maneuvers, speed changes, route guidance, and the like. In embodiments, the decision service module 324 may determine one or more driving decisions for a requesting vehicle to maximize a particular objective based on the type of service request received. For a safety related decision service request, the decision service module 324 may determine one or more driving decisions to maximize safety. For an energy efficiency related decision service request, the decision service module 324 may determine one or more driving decisions to maximize energy efficiency. For a travel time related decision service request, the decision service module 324 may determine one or more driving decisions to minimize travel time.

The decision service module 324 may determine one or more driving decisions in response to a service request based on the type of decision service request (e.g., safety related, energy efficiency related, travel time related), and based on sensor data received from the requesting vehicle along with the service request and/or sensor data captured by the sensors 307 of the roadside server 102. In embodiments, the decision service module 324 may utilize artificial intelligence, machine learning and/or deep learning algorithms to determine one or more driving decisions in response to a received decision service request.

The service message transmission module 326 may transmit a service message to a requesting vehicle in response to a service request. In particular, the service message transmission module 326 may transmit a service message determined by the perception service module 320, the localization service module 322, or the decision service module 324, based on the type of service request received. As discussed above, in some examples, the network interface hardware 306 may include a DSRC channel and a millimeter wave radio channel. DSRC has a lower bandwidth than millimeter wave radio. Accordingly, the service message transmission module 326 may utilize a DSRC channel to transmit decision service messages, localization service messages, object-level perception messages, and feature-level perception messages, as these types of messages require relatively low bandwidth. However, raw-data perception messages typically require higher bandwidth since they include raw data. Thus, DSRC may not have sufficient bandwidth to transmit raw-data perception messages. Accordingly, the service message transmission module 326 may utilize a millimeter wave radio channel to transmit raw-data perception messages.

After the service message transmission module 326 transmits a service message to the requesting vehicle, the service message may be received by the requesting vehicle. For legacy vehicles, information contained in the service message received by the legacy vehicles may be displayed to a driver of the vehicle. In some examples, this information may be displayed on an interface (e.g., a display screen) in the legacy vehicle. In other examples in which a driver of a legacy vehicles utilizes a smartphone to transmit service requests to the roadside server 102, the smartphone may receive a service message and may display information contained in the service message on a display screen of the smartphone. The driver of the vehicle may view the displayed information and may make driving decisions accordingly.

For legacy vehicles requesting object-level perception service, a received object-level perception message may indicate positions and shapes of bounding boxes associated with identified road objects. Upon receiving an object-level perception message, the requesting legacy vehicle or smartphone may display an image and/or coordinates of the bounding boxes of the identified road objects. For legacy vehicles requesting localization service, a received localization message may indicate a position of the requesting vehicle. Accordingly, the requesting legacy vehicle or smartphone may display an image indicating the position of the vehicle. For legacy vehicles requesting decision service, a received decision message may indicate a recommended driving decision for the vehicle to perform (e.g., a suggested route). After receiving the decision message, the requesting legacy vehicle or smartphone may display an image of the suggested route or other suggested driving decision on a display.

For autonomous or semi-autonomous vehicles, after receiving a service message from the roadside server 102, in some examples, the computing resources of such vehicles may be utilized to further process data contained in the service message. For example, upon receiving a perception service message, the data contained in the perception service message may be fused with data collected by the vehicle sensors 210. This allows the vehicle system 200 to access to both the data gathered directly by the on-board vehicle sensors 210 and the sensors 307 of the roadside server 102. This data fusion may comprise fusing object-level data received in an object-level perception message, feature-level data received in a feature-level perception message, and/or raw data received in a raw-data perception message.

Similarly, when an autonomous or semi-autonomous vehicle receives a localization service message, the data contained in the localization service message may be fused with localization data stored locally on the vehicle. This data fusion may comprise fusing road-level localization data received in a road-level localization message, lane-level localization data received in a lane-level localization message, and/or global map data received in a global map localization message.

After fusing perception data or localization data, the autonomous or semi-autonomous vehicle perform additional processing of the fused perception or localization data to determine perception or localization information, respectively (e.g., localizing the vehicle or identifying nearby road agents). By utilizing fused perception or localization data, the vehicle may be able to determine more accurate perception or localization information than using only data collected using on-board vehicle sensors 210 or using only the data collected by the sensors 307 of the roadside server 102. The vehicle may then make driving decisions based on the fused perception or localization information.

Alternatively, after an autonomous or semi-autonomous vehicle receives a decision service message, the vehicle may implement the one or more driving decisions contained in the received decision service message.

Figure 4:
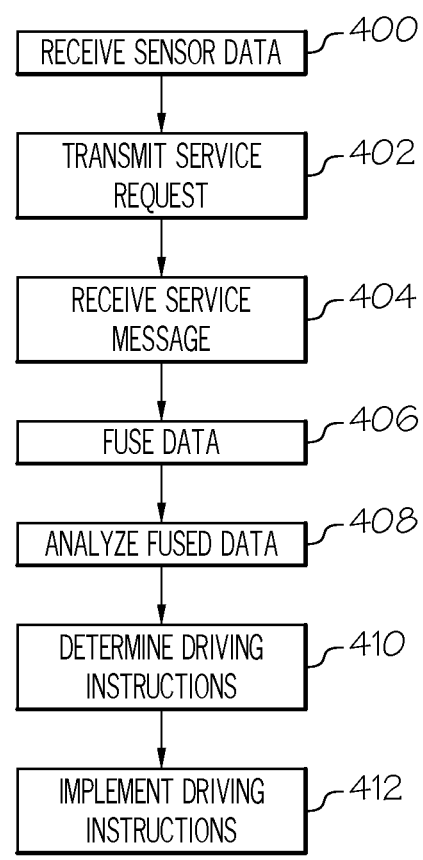
FIG. 4 depicts a flowchart of a method of operating an autonomous vehicle of FIGS. 1-2, according to one or more embodiments shown and described herein.

FIG. 4 depicts a flowchart of a method for operating an autonomous vehicle in the system 100 of FIG. 1 (e.g., one of the vehicles 104, 106, or 108). At step 400, the sensors 210 of the vehicle system 200 receive sensor data. The sensor data gathered by the sensors 210 may indicate environment information or information about other road agents positioned near the vehicle.

At step 402, the network interface hardware 212 transmits a service request to the roadside server 102. The service request may comprise a customized request for a particular type of service. In embodiments, a service request may comprise a request for perception service, localization service, or decision service. In addition, a service request may comprise a request for a particular type of perception service, localization service, or decision service, as discussed above. In some examples, a service request may be generated based on input from a driver (e.g., a driver may enter the parameters of a service request into an interface of the vehicle system 200). In other examples, a service request may be automatically generated by the processors 202 (e.g., a service request may be based on perception information needed by an autonomous driving system that is unavailable based on the data gathered by the on-board vehicle sensors 210). In some examples, the service request may include data gathered by the vehicle sensors 210.

At step 404, the network interface hardware 212 receive a service message from the roadside server 102 in response to a transmitted service request. The service message may contain information responsive to the custom service request, as described above. The service message may be stored in the data storage component 214.

At step 406, the processors 202 fuse data contained in the service message with data gathered by the sensors 210 of the vehicle system 200. For a perception service message, the processors 202 may fuse perception data contained in the perception service message with perception data gathered by the sensors 210. For a localization service message, the processors 202 may fuse localization data contained in the localization service message with localization data gathered by the sensors 210. For a decision service message, there is generally no data to fuse with data gathered by the sensors 210. Furthermore, in some examples, data received in a perception service message or a localization service message may not be fused with data gathered by the sensors 210. For example, the sensors 210 may not have gathered any data that can be fused with data received in a service message. Alternatively, it may be desirable to use only data received in a service message (e.g., this data may be more reliable than data gathered by the vehicle sensors 210). In examples where a decision service message is received, or it is not desirable to fuse data received from the roadside server 102 with data captured by the vehicle system 200, step 406 of FIG. 4 may be omitted.

At step 408, the vehicle system 200 analyzes the fused data. In some examples, the autonomous driving module of the vehicle system 200 may analyze the fused data to determine perception information or localization information. For example, autonomous driving module may analyze raw data or feature level data received in a perception service message to identify road agents. In some examples where data is not fused, as discussed in examples above, the autonomous driving module of the vehicle system 200 may solely analyze data received in a service message from the roadside server 102 to determine perception information and/or localization information. Alternatively, in examples where a received service message comprises a decision service message and there is no data in the service message to analyze, step 408 may be omitted from FIG. 4.

At step 410, the autonomous driving module of the vehicle system 200 determines driving instructions based on data received from the roadside server 102 and/or the analysis of the data or the fused data discussed above. In examples where a perception service message is received, the autonomous driving module may determine driving instructions based on identified road agents (e.g., to maintain a certain distance from the road agents). In examples where a localization service message is received, the autonomous driving module may determine driving instructions based on a determined localization of the vehicle (e.g., to be positioned within a certain lane of a road). In examples where a decision service message is received, the driving instructions contained in the decision service message may be directly implemented by the vehicle. At step 412, the autonomous driving module may implement the driving instructions determined at step 410.

Figure 5:
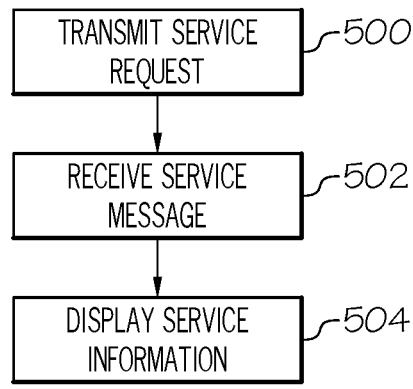
FIG. 5 depicts a flowchart of a method of operating a legacy vehicle of FIGS. 1-2, according to one or more embodiments shown and described herein.

FIG. 5 depicts a flowchart of a method for operating a legacy vehicle in the system 100 of FIG. 1 (e.g., one of the vehicles 104, 106, or 108). At step 500, a service request may be transmitted to the roadside server 102. In some examples, the service request may be transmitted by the network interface hardware 212 of the vehicle system. In other examples, the service request may be transmitted by a smartphone or other device operated by a driver of the vehicle. The transmitted service request may be a customized service request based on parameters input by the driver. In some examples, the parameters for the service request may be input by the driver into an interface of the vehicle system 200. In other examples, the parameters for the service request may be input into a smartphone or other device using a dedicated application. The service request may comprise a perception service request, a localization service request, or a decision service request, as discussed above.

At step 502, the vehicle system or smartphone that transmitted the service request receives a service message from the roadside server 102. The service message may contain information responsive to the service request, as described above.

At step 504, an interface of the vehicle system 200 or a display of a smartphone displays information contained in the received service message. For a perception service request, an image of bounding boxes associated with one or more identified road agents may be displayed. For a localization service request, an image of the determined position of the requesting vehicle may be displayed. For a decision service request, information about the driving instructions contained in a received decision service message may be displayed (e.g., route directions or specific driving instructions). In some examples, when a decision service message contains route guidance or a suggested route, the route guidance or suggested may route may be automatically integrated with route guidance or turn-by-turn directions of the vehicle system 200 or a smartphone of the driver.

Figure 6:
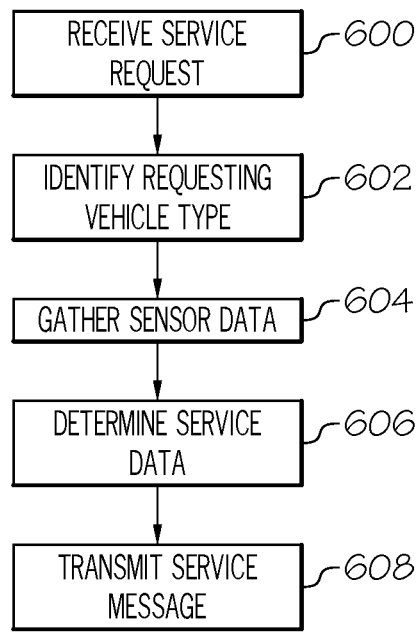
FIG. 6 depicts a flowchart of a method of operating the roadside server of FIGS. 1-2, according to one or more embodiments shown and described herein.

FIG. 6 depicts a flowchart of a method for operating the roadside server 102 of FIGS. 1 and 3. At step 600, the service request reception module 314 receives a service request from a requesting vehicle. In some examples, the service request reception module 314 may receive a service request from a smartphone or other device rather than a vehicle, as discussed above. The received service request may contain a customized request for service. In embodiments, the service request may comprise a request for perception service, a request for localization service, or a request for decision service. In some examples, a received service request may contain sensor data collected by the requesting vehicle.

At step 602, the target vehicle identification module 316 identifies a vehicle type of the requesting vehicle. In some examples, the target vehicle identification module 316 may determine whether the requesting vehicle is an autonomous vehicle, a semi-autonomous vehicle, or a legacy vehicle. In some examples, the target vehicle identification module 316 may determine a level of automation of a requesting vehicle (e.g., from L0-L5). The target vehicle identification module 316 may identify the vehicle type of the requesting vehicle based on the content of the received service request.

At step 604, the sensors 307 of the roadside server 102 gather sensor data. In particular, the sensors 307 may gather data about the road environment surrounding the requesting vehicle. In some examples where sensor data collected by the roadside server 102 is not needed to complete the service request, step 604 of FIG. 6 may be omitted.

At step 606, the roadside server 102 determines service data that is responsive to the received service request. For a perception service request, the perception service module 320 may determine perception service data. For a localization service request, the localization service module 322 may determine localization service data. For a decision service request, the decision service module 324 may determine decision service data. The service data may be determined based on vehicle sensor data contained in the received service request and/or data gathered by the sensors 307 of the roadside server 102. In some examples, the perception service module 320, the localization service module 322, or the decision service module 324 may determine service data responsive to a service request by utilizing artificial intelligence, machine learning, and/or deep learning algorithms. In some examples, the determined service data may be based on the vehicle type of the requesting vehicle determined by the target vehicle identification module 316.

At step 608, the service message transmission module 326 transmits a service message containing the determined service data to the requesting vehicle. For a raw-data service message, the service message transmission module 326 may transmit the service message using millimeter wave radio. For other types of service messages, the service message transmission module 326 may transmit the service message using DSRC.

It should now be understood that embodiments described herein are directed to a method and system for on-demand roadside AI service. A vehicle may transmit a service request to a roadside server. The service request may contain a customized request for perception service, localization service, or decision service. The service request may contain data gathered by vehicle sensors. The requesting vehicle may be an autonomous vehicle, a semi-autonomous vehicle, or a legacy vehicle.

The roadside server may receive the service request. The roadside server may determine a vehicle type of the requesting vehicle based on the service request. In some examples, the roadside server may gather additional data from roadside server sensors. The roadside server may then determine a service message responsive to the service request based on the service request, the data contained in the service request, and the data gathered by the roadside server sensors. In some examples, the type of service message determined by the roadside server may depend on the vehicle type of the requesting vehicle (e.g., a level of automation of the vehicle). The roadside server may then transmit the determined service message to the requesting vehicle. The vehicle may receive the service message and may display data to a driver based on the received service message and/or perform one or more driving functions based on the received service message.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
  receiving a service request from a vehicle;
  obtaining environment data with one or more sensors;
  determining a vehicle type of the vehicle based on the service request;
  determining service data responsive to the service request based on the vehicle type of the vehicle and the environment data; and
  transmitting a service message comprising the determined service data to the vehicle.

2. The method of claim 1, further comprising:
  receiving sensor data collected by the vehicle as part of the service request; and
  determining the service data responsive to the service request based at least in part on the sensor data collected by the vehicle.

3. The method of claim 1, wherein the vehicle type comprises an automation level of the vehicle.

4. The method of claim 1, wherein:
  the service request comprises a request for perception service; and
  the service data comprises data associated with one or more road agents in the vicinity of the vehicle.

5. The method of claim 4, further comprising, upon determination that the vehicle type is an autonomous vehicle:
  transmitting the service message via millimeter wave radio.

6. The method of claim 4, further comprising, upon determination that the vehicle type is a semi-autonomous vehicle:
  extracting features based on the environment data; and
  transmitting the service message comprising the extracted features via Dedicated Short-Range Communication (DSRC).

7. The method of claim 4, further comprising, upon determination that the vehicle type is a legacy vehicle:
  determining positions of one or more road agents based on the environment data; and
  transmitting the service message comprising the determined positions of the one or more road agents via DSRC.

8. The method of claim 1, wherein:
  the service request comprises a request for localization service; and the service data comprises a location of the vehicle.

9. The method of claim 1, wherein:
the service request comprises a request for decision service; and
the service data comprises one or more driving instructions.

10. A roadside server comprising a controller configured to:
receive a service request from a vehicle;
obtain environment data with one or more sensors;
determine a vehicle type of the vehicle based on the service request;
determine service data responsive to the service request based on the vehicle type of the vehicle and the environment data; and
transmit a service message comprising the determined service data to the vehicle.

11. The roadside server of claim 10, wherein the controller is further configured to:
receive sensor data collected by the vehicle as part of the service request; and
determine the service data responsive to the service request based at least in part on the sensor data collected by the vehicle.

12. The roadside server of claim 10, wherein:
the service request comprises a request for perception service; and
the service data comprises data associated with one or more road agents in the vicinity of the vehicle.

13. The roadside server of claim 12, wherein the controller is further configured to, upon determination that the vehicle type is an autonomous vehicle:
transmit the service message via millimeter wave radio.

14. The roadside server of claim 12, wherein the controller is further configured to, upon determination that the vehicle type is a semi-autonomous vehicle:
extract features based on the environment data; and
transmit the service message comprising the extracted features via DSRC.

15. The roadside server of claim 12, wherein the controller is further configured to, upon determination that the vehicle type is a legacy vehicle:
determine positions of the one or more road agents based on the environment data; and
transmit the service message comprising the determined positions of the one or more road agents via DSRC.

* * * * *